March 10, 1925.

S. EDELMAN

FLOWER HOLDER

Filed Jan. 6, 1923

1,529,245

Witnesses
Charles H. Buckler
George A. Guss

Inventor
Samuel Edelman
By Joshua R. H. Potts
His Attorney

Patented Mar. 10, 1925.

1,529,245

UNITED STATES PATENT OFFICE.

SAMUEL EDELMAN, OF PHILADELPHIA, PENNSYLVANIA.

FLOWER HOLDER.

Application filed January 6, 1923. Serial No. 611,202.

*To all whom it may concern:*

Be it known that I, SAMUEL EDELMAN, a citizen of the United States, residing at Philadelphia, in the county of Philadelphia and State of Pennsylvania, have invented certain new and useful Improvements in Flower Holders, of which the following is a specification.

My invention relates to flower holders, more particularly to the type which has rods spaced apart to permit the stems of flowers to be placed between them and which is adapted to be placed in a flower bowl.

The object is to provide a flower holder which will sit properly in a bowl having an uneven or irregular bottom surface and which will facilitate its manufacture, and a method of making the same which makes it an inexpensive and durable product.

This object, and other advantageous ends which will be described hereinafter, I attain in the following manner, reference being had to the accompanying drawings in which—

Figure 1:
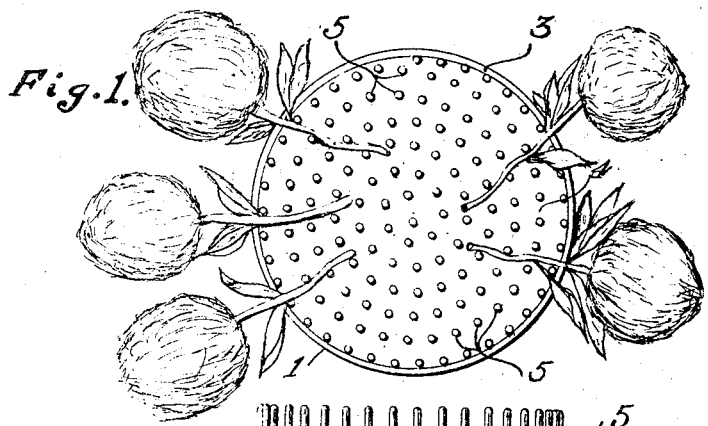
Figure 2:
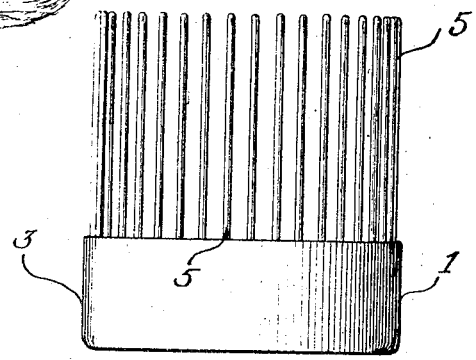
Figure 3:
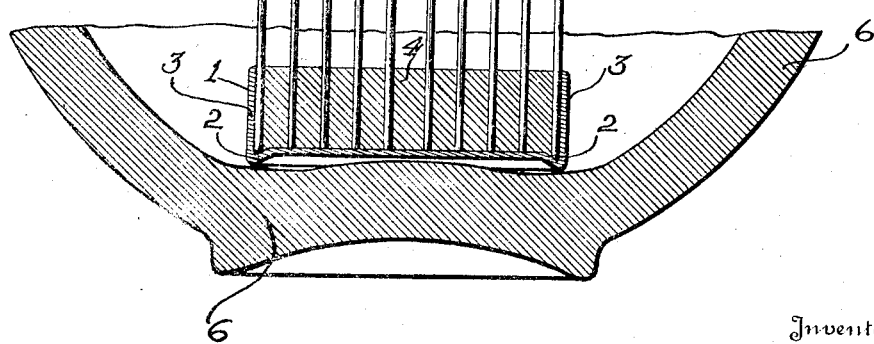

Figure 1 is a plan view of a flower holder constructed in accordance with my invention, illustrating the manner in which flowers are placed in it, Figure 2 a side view of Figure 1, and Figure 3 a central section through the device shown in Figure 1 illustrating its position on an uneven bottom surface of a bowl.

Referring to the drawings, 1 indicates a casing having a recessed bottom 2 and an imperforate wall 3, preferably cylindrical. Plastic material 4 is placed in the casing and upright rods 5 positioned in the plastic material, the rods being spaced apart to permit the stems of flowers to be placed between them as shown in Figure 1.

To make the flower holder, the casing is preferably stamped from sheet metal and then filled with plastic material. The ends of the rods are then placed in the plastic material and the material hardened, thus rigidly holding the rods in position. If desired, instead of first filling the casing with plastic material, and then placing the rods therein, the rods may be first placed in the casing and then the casing filled with the plastic material, after which the plastic material may be hardened. By constructing the flower holder in this manner a very durable and inexpensive product is produced. No mold is required and consequently no removal of the device from the mold.

When the device is in use, the stems of flowers are placed between the rods and the device placed in a bowl 6. If the bowl should have an uneven bottom surface, the flower holder will rest evenly by reason of the recessed bottom which permits the convex bottom or any humps or irregularities of a flower bowl to project therein.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is—

1. A flower holder comprising a casing; hardened plastic material within the casing, and rods in the material.

2. A flower holder comprising a casing having imperforate walls; hardened plastic material within the casing, and rods in the material.

3. A flower holder comprising a casing having a recessed bottom; hardened plastic material within the casing, and rods in the material.

In testimony whereof I have signed my name to this specification in the presence of two subscribing witnesses.

SAMUEL EDELMAN.

Witnesses:
ELIZABETH GARBE,
CHAS. E. POTTS.